(12) United States Patent
Amesbury

(10) Patent No.: US 8,308,534 B1
(45) Date of Patent: Nov. 13, 2012

(54) DEVICE FOR KILLING WOUNDED FOWL

(76) Inventor: Robert Bruce Amesbury, Mount Shasta, CA (US)

( * ) Notice: Subject to any disclaimer, the term of this patent is extended or adjusted under 35 U.S.C. 154(b) by 0 days.

(21) Appl. No.: 13/417,176

(22) Filed: Mar. 9, 2012

Related U.S. Application Data

(60) Provisional application No. 61/484,166, filed on May 9, 2011.

(51) Int. Cl.
*A22B 7/00* (2006.01)
(52) U.S. Cl. ........................................................ 452/52
(58) Field of Classification Search ............... 452/2–5, 452/102–105, 12–17
See application file for complete search history.

(56) References Cited

U.S. PATENT DOCUMENTS

| 2,473,608 | A * | 6/1949 | Plock | 452/17 |
| 7,163,452 | B1 * | 1/2007 | Taylor et al. | 452/103 |
| 7,169,033 | B1 * | 1/2007 | Colbert | 452/103 |

* cited by examiner

*Primary Examiner* — Richard Price, Jr.

(57) ABSTRACT

A plier type of device can quickly and humanely kills wounded fowl. The device may be applied to either side of the temple of the fowl and a quick squeeze may crush the temple and quickly kill the wounded fowl. The device may include a handle end that may be squeezed together to cause a head gripper end to close. The head gripper end may include points, typically cone shaped, that may be pointed toward each other and may approach each other as the head gripper end closes.

6 Claims, 3 Drawing Sheets

DEVICE FOR KILLING WOUNDED FOWL

CROSS-REFERENCE TO RELATED APPLICATIONS

This application claims the benefit of priority of U.S. Provisional patent application No. 61/484,166, filed May 9, 2011, the contents of which are herein incorporated by reference.

BACKGROUND OF THE INVENTION

The present invention relates to hunting accessories and, more particularly, to a plier type device for killing wounded foul.

When hunting fowl, such as waterfowl or upland game birds, often times the birds become wounded from shooting. Upon retrieving, it becomes a problem on final killing the birds once they are in hand. Often, hunters may resort to ringing the neck, biting the head or beating the head on a hard object. Such methods may be slow to work, unsanitary, and may be inhumane.

As can be seen, there is a need for a device for quickly and humanely kills wounded fowl.

SUMMARY OF THE INVENTION

In one aspect of the present invention, a device comprises a first handle; a second handle pivotably connected to the first handle at a hinge point; a first head gripper end disposed at an end of the first handle; a second head gripper end disposed an end of the second handle; and a set of impact points attached to the first and second head gripper ends.

In another aspect of the present invention, a device comprises a first handle; a second handle pivotably connected to the first handle at a hinge point; a first head gripper end disposed at an end of the first handle; a second head gripper end disposed an end of the second handle; a set of impact points attached to the first and second head gripper ends; a spring disposed to resiliently push the first handle away from the second handle; and a lock adapted to hold the first handle to the second handle.

In a further aspect of the present invention, a method for killing fowl comprises disposing impact points at each side of the fowl's head, the impact points attached to first and second head gripper ends, the first and second head gripper ends attached to first and second handles, where the first and second handles are pivotably attached to each other at a hinge point; squeezing the first and second handles together to cause the first and second gripper ends to move closer together, causing the impact points to press into the fowl's head; and releasing the first and second handles to released killed fowl from the first and second head gripper ends.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a plier type of device that may quickly and humanely kill wounded fowl. The device may be applied to either side of the temple of the fowl and a quick squeeze may crush the temple and quickly kill the wounded fowl. The device may include a handle end that may be squeezed together to cause a head gripper end to close. The head gripper end may include points, typically cone shaped, that may be pointed toward each other and may approach each other as the head gripper end closes.

Figure 1:
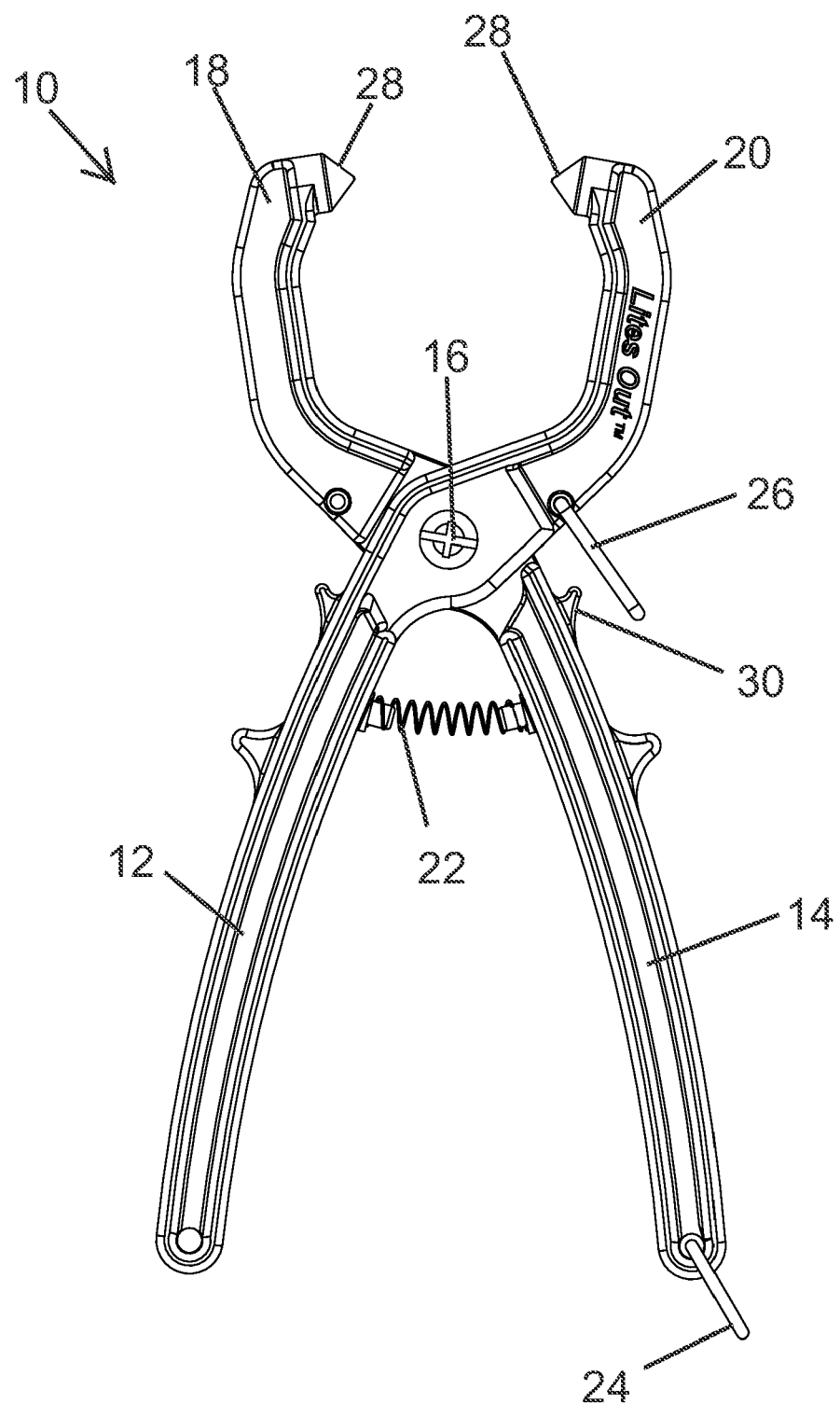
FIG. 1 is a side view of a wounded fowl killing device in an open position according to an exemplary embodiment of the present invention.
Figure 2:
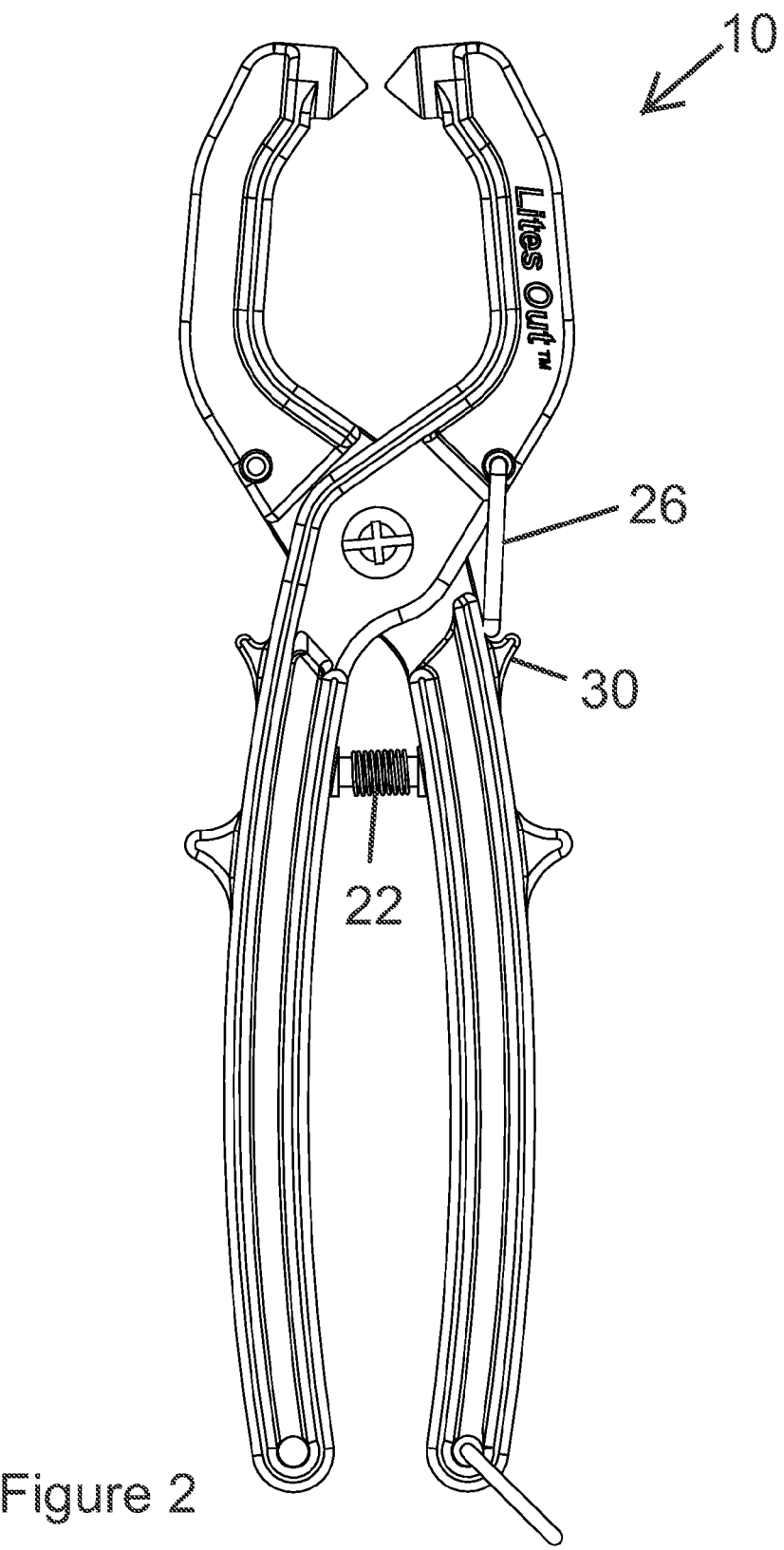
FIG. 2 is a side view of the wounded fowl killing device of FIG. 1 in a closed position.
Figure 3:
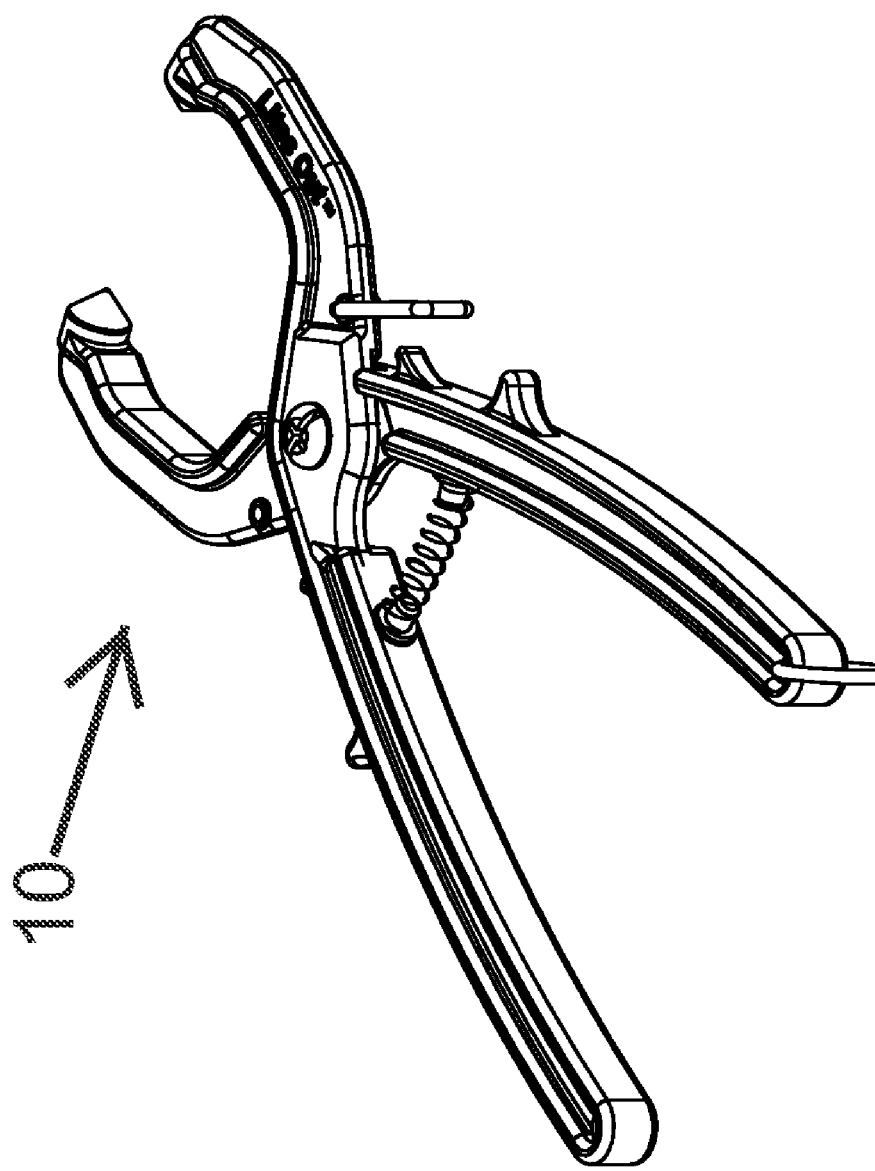
FIG. 3 is a perspective view of the wounded fowl killing device of FIG. 1.

Referring now to FIGS. 1 through 3, a fowl killing device 10 (also referred to as device 10) may include a first handle 12 and a second handle 14 attached to pivot on a hinge point 16. The hinge point 16 may include, for example, a stainless steel bolt, washer and lock nut.

The handles 12, 14 may be squeezed together to cause head gripper ends 18, 20 to move together. A spring 22 may be disposed between the handles 12, 14 to resiliently keep the handles 12, 14 apart (and, therefore, the head gripper ends 18, 20 apart), until squeezed by the user. A lock 26 and a lock grip 30 may be disposed on the handles 12, 14 to keep the handles 12, 14 squeezed together for storage when not in use. The lock 26 may be positioned in various locations and may function in various manners provided that the lock 26 keeps the handles 12, 14 together, as shown in FIG. 2.

The head gripper ends 18, 20 may each include a point of impact 28. These points 28 may be, for example, cone shaped, having their tips point toward each other. The points 28 may be made of aluminum, plastic, or may be made integrally with the head gripper ends 18, 20. In some embodiments, the points 28 may be removably attached to the ends of the head gripper ends 18, 20. The points 28 may be made of various shapes and sizes. For example, they could be longer, shorter or narrower than shown in the figures.

The device 10 may have an overall length from about 6 to about 10 inches, typically about 8 inches, which would include about 6 inches of handles 12, 14 and 2 inches of the head gripper ends 18, 20. The device 10 may be made from pot metal, stainless steel, plastic, fiberglass, aluminum, composite, or some other suitable material. The points 28 may be made of the same or different materials from the remainder of the device 10. In some embodiments, the handles may be made with a T-shaped cross-section, although other designs may be suitable and within the scope of the present invention. The handles 12, 14 may include a grip, such as a rubberized grip.

The device 10 can be configured and designed to allow a user to squeeze the pliers with one hand. After the two points are placed on the temple of the wounded fowl's head and the handles 12, 14 are squeezed together with a quick thrust and held for approximately 10-25 pounds of force for 5-10 seconds, the wounded fowl dies.

The device 10 may be used not only for hunters to kill wounded fowl, but also in a farm environment, for example, for killing poultry or used with fishing to kill fish. Various attachments may be included with the device 10, such as a can/bottle opener, flashlight, knife blade, choke tube remover, screwdriver, or tools for field-stripping firearms.

It should be understood, of course, that the foregoing relates to exemplary embodiments of the invention and that modifications may be made without departing from the spirit and scope of the invention as set forth in the following claims.

What is claimed is:

1. A method for killing fowl, comprising:
disposing impact points at each side of the fowl's head, the impact points attached to first and second head gripper ends, the first and second head gripper ends attached to first and second handles, where the first and second handles are pivotably attached to each other at a hinge point;
squeezing the first and second handles together to cause the first and second gripper ends to move closer together, causing the impact points to press into the fowl's head; and
releasing the first and second handles to release killed fowl from the first and second head gripper ends.

2. The method of claim 1, further comprising unlocking a lock to allow the first and second handles to open via a spring disposed between the first and second handles.

3. The method of claim 1, further comprising holding the first handle to the second handle with a lock when not in use.

4. The method of claim 1, wherein the impact points are cone shaped points having tips pointing toward each other.

5. The method of claim 1, wherein the impact points are removably attached to the first and second head gripper ends.

6. The method of claim 1, wherein the impact points are permanently attached to the first and second head gripper ends.

* * * * *